US008635125B2

(12) United States Patent
Baer et al.

(10) Patent No.: US 8,635,125 B2
(45) Date of Patent: Jan. 21, 2014

(54) AUTOMATIC CALCULATION WITH MULTIPLE EDITABLE FIELDS

(75) Inventors: Matthias Baer, Seattle, WA (US); Amit Arora, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1443 days.

(21) Appl. No.: 11/825,109

(22) Filed: Jul. 3, 2007

(65) Prior Publication Data

US 2009/0013018 A1     Jan. 8, 2009

(51) Int. Cl.
*G06F 17/22* (2006.01)
*G07F 19/00* (2006.01)
*G06Q 20/20* (2012.01)
*G06Q 40/00* (2012.01)

(52) U.S. Cl.
CPC ............ *G06Q 20/207* (2013.01); *G06Q 40/103* (2013.01); *G06Q 40/00* (2013.01)
USPC .................... 705/30; 705/19; 705/31; 705/35

(58) Field of Classification Search
CPC .... G06Q 20/207; G06Q 40/103; G06Q 40/00
USPC .................. 705/19, 35, 31, 30, 26, 27, 14.35; 715/212, 217; 708/131; 707/999.1; 1/1
See application file for complete search history.

(56) References Cited

U.S. PATENT DOCUMENTS

| 4,811,199 | A | * | 3/1989 | Kuechler et al. ....................... 1/1 |
| 5,237,678 | A | * | 8/1993 | Kuechler et al. ....................... 1/1 |
| 5,335,169 | A | * | 8/1994 | Chong ............................. 705/31 |
| 5,339,410 | A | * | 8/1994 | Kanai .................................... 1/1 |
| 5,361,393 | A | * | 11/1994 | Rossillo ............................ 713/1 |
| 6,078,898 | A | * | 6/2000 | Davis et al. ...................... 705/19 |
| 6,173,270 | B1 | * | 1/2001 | Cristofich et al. .............. 705/37 |
| 6,742,162 | B2 | * | 5/2004 | Bennett ......................... 715/217 |
| 7,177,834 | B1 | * | 2/2007 | Maestle .......................... 705/38 |
| 7,200,569 | B2 | * | 4/2007 | Gallagher et al. .............. 705/31 |
| 7,313,538 | B2 | * | 12/2007 | Wilmes et al. .................. 705/31 |
| 7,319,982 | B1 | * | 1/2008 | Ryan et al. ...................... 705/31 |
| 7,353,200 | B1 | * | 4/2008 | Brumberg ....................... 705/37 |
| 7,584,884 | B2 | * | 9/2009 | Fox et al. ...................... 235/379 |
| 2002/0052792 | A1 | * | 5/2002 | Johnson et al. ................. 705/19 |
| 2003/0216995 | A1 | * | 11/2003 | DePauw et al. ................. 705/37 |
| 2004/0078282 | A1 | * | 4/2004 | Robinson ........................ 705/26 |
| 2005/0278233 | A1 | * | 12/2005 | Bross et al. ..................... 705/31 |

(Continued)

OTHER PUBLICATIONS

Mark E. Gunnison, "www.mgcpa.com", as retrieved from the WayBack Machine on Oct. 15, 2006.*

(Continued)

*Primary Examiner* — Matthew Gart
*Assistant Examiner* — Olusegun Goyea
(74) *Attorney, Agent, or Firm* — Kelly, Holt & Christenson

(57) ABSTRACT

A simplified transaction data management system using automatic calculation with multiple editable fields is provided. The system enables a user to manage transactions with a simplified interface, with multiple editable fields and automatic calculation of other fields based on mathematical relations with inputs that are received in any of the other editable fields. For example, either net amounts subject to a tax or gross amounts including the tax may be entered for a transaction, and the other value is automatically computed and displayed. Either value may subsequently be re-entered, and the other value may again automatically be computed and displayed, replacing the earlier input and output.

20 Claims, 4 Drawing Sheets

(56) References Cited

U.S. PATENT DOCUMENTS

| | | | |
|---|---|---|---|
| 2006/0224480 A1* | 10/2006 | Bent et al. | 705/35 |
| 2006/0224558 A1* | 10/2006 | Flora et al. | 707/1 |
| 2006/0271463 A1* | 11/2006 | Young | 705/35 |
| 2007/0050258 A1* | 3/2007 | Dohse | 705/14 |
| 2007/0050308 A1* | 3/2007 | Latvala et al. | 705/80 |
| 2007/0055571 A1* | 3/2007 | Fox et al. | 705/19 |
| 2007/0136156 A1* | 6/2007 | Seeley et al. | 705/30 |
| 2007/0220416 A1* | 9/2007 | Mitsui | 715/503 |
| 2008/0177624 A9* | 7/2008 | Dohse | 705/14 |
| 2008/0183616 A1* | 7/2008 | Hankey et al. | 705/38 |
| 2011/0022486 A1* | 1/2011 | Von Drehnen et al. | 705/19 |

OTHER PUBLICATIONS

"www.diyaccounting.co.uk", as retrieved from the WayBack Machine on May 19, 2011.*

"Sage 50 Accounts 2008", http://shop.sage.co.uk/accounts.aspx, Sage (UK) Limited 2007; retrieved Sep. 28, 2007.

* cited by examiner

| Demo - Untitled - Purchase Invoices | | | | | | | |
|---|---|---|---|---|---|---|---|
| File  Edit  View  Tools  Actions  Help | | | | | | | |
| ☐ Save and Close  ☐ Save and New  Current Layout: Default ▼  Modify Layout  Jurisdiction: U.K. | | | | | | | |
| Invoices | | | | | | | |
| Date | Supplier | Nominal Acct. | Reference | Net Amount | Tax Code | Tax | Gross Amount |
| 1/1/2007 | XYZ Corp. | Purchases |  | £100.00 | S | £17.50 | £117.50 |

Total Net: £100.00
Total Tax: £17.50
Total Gross: £117.50

| Demo - Untitled - Purchase Invoices | | | | | | |
|---|---|---|---|---|---|---|
| File Edit View Tools Actions Help | | | | | | |
| ☐Save and Close ☐Save and New | Current Layout: | Default ▼ | Modify Layout | Jurisdiction: | U.K. | |
| Invoices | | | | | | |
| Date | Supplier | Nominal Acct. | Reference | Net Amount | Tax Code | Gross Amount |
| 1/1/2007 | XYZ Corp. | Purchases | | £85.11 | S | £100.00 |
| | | | | 35 | 15 | 33  31 |

Total Net: £85.11
Total Tax: £14.89
Total Gross: £100.00

AUTOMATIC CALCULATION WITH MULTIPLE EDITABLE FIELDS

BACKGROUND

Transactions are often performed with different applicable taxes, such as sales taxes and value-added taxes, which must be tracked accurately for accounting purposes. Sales and purchases are sometimes initially recorded with gross values that include one or more taxes, and sometimes initially recorded with net values, prior to or not subject to application of various taxes. Systems for recording taxable transactions have typically provided for a net amount to be input and for other information such as gross amounts to be calculated from the net amount, with more complicated procedures required if a gross amount is to be provided as input or if a net amount is otherwise to be determined from other information.

The discussion above is merely provided for general background information and is not intended to be used as an aid in determining the scope of the claimed subject matter.

SUMMARY

New devices, systems and methods are hereby provided that enable a user to manage transactions with a simplified interface, with multiple editable fields and automatic calculation of output values based on mathematical relations and inputs that are received in any of various editable fields. Any one of two or more editable fields may receive a numeric input, and output values in a mathematical relation with the numeric input may be automatically calculated and displayed in their own editable fields. Values in any of the editable fields may subsequently be re-entered, and the other values may again automatically be computed and displayed, replacing the earlier input and outputs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 1 depicts a screenshot of a user interface for an automatic calculation system, according to an illustrative embodiment and context of usage.

FIG. 2 depicts a screenshot of a user interface for an automatic calculation system, according to an illustrative embodiment and context of usage.

DETAILED DESCRIPTION

Figure 3:
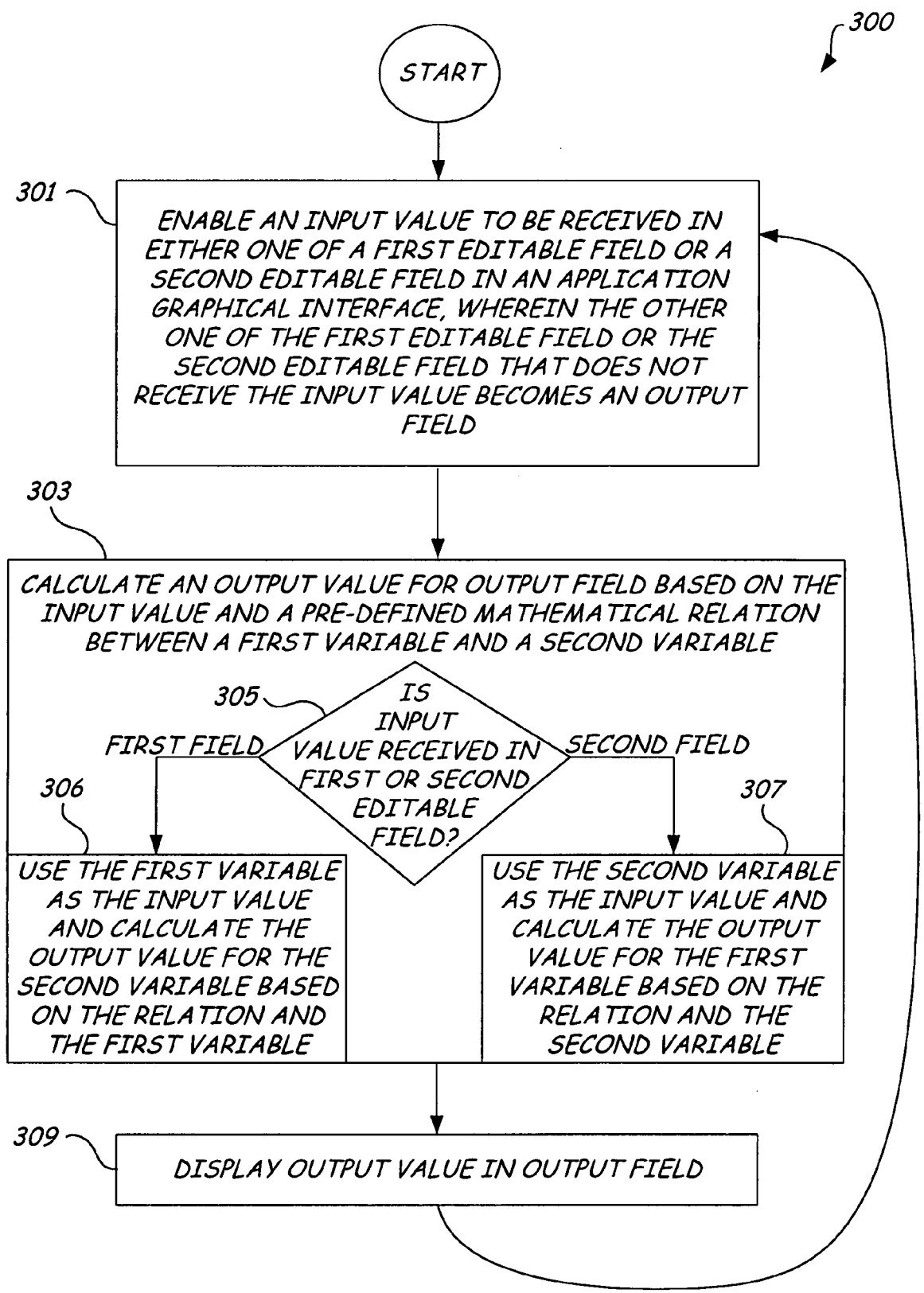
FIG. 3 depicts a flowchart for a method, according to an illustrative embodiment.
Figure 4:
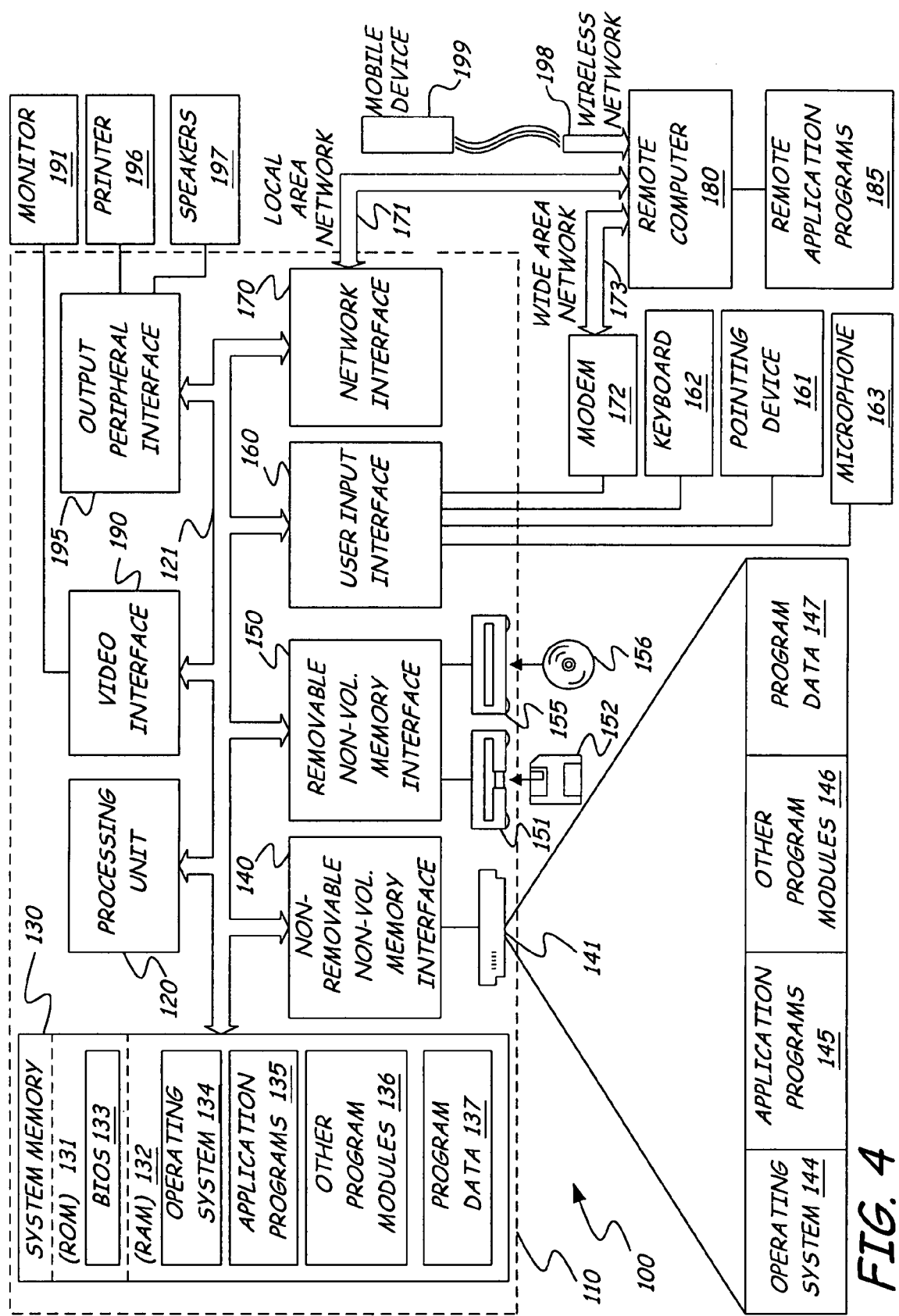
FIG. 4 depicts a block diagram of a computing system, according to an illustrative embodiment.

FIGS. 1 and 2 each depict a screenshot, in different illustrative contexts, of a graphical user interface for an automatic calculation system 10, 10B that enables automatic calculation with multiple editable fields, according to illustrative embodiments. FIG. 3 depicts a flowchart for a method for an automatic calculation system 300 that enables automatic calculation with multiple editable fields, according to an illustrative embodiment. FIG. 4 depicts a block diagram of a computing system 100 that may be used to implement an automatic calculation system with multiple editable fields, according to an illustrative embodiment. Automatic calculation system 10, 10B, 300 may be illustrative of embodiments that include computing systems, executable instructions configured to be executable by computing systems, methods, and contexts that enable method embodiments, for example. The following discussion provides further details of various illustrative embodiments. While certain illustrative arrangements, labels, screenshots, and samples of inputs and outputs being processed by a computer-implemented method, are included in this and the subsequent figures, they are intended as illustrative and indicative of the variety and broader meaning provided in the discussion and claims herein. A variety of illustrative features and implementations are described herein that help illustrate the inventive subject matter, although that subject matter is broader than can be described herein in complete detail; none of the particular illustrative embodiments or details thereof as described below define limits that exclude other embodiments, aspects, and variations.

As depicted in FIG. 1, automatic calculation system 10 includes a variety of editable input fields, some configured to receive general text inputs, and others configured to receive numeric inputs. These editable fields are grouped in rows or arrays under a collection of column headings, one column for each editable field in each row, in this illustrative embodiment. The set of rows and columns depicted may be included in a file or a sheet within a file that is associated with a record of commercial or financial transactions of a given type, such as a purchase invoice, a cash receipt, a cash payment, a price quote, a sales order, a sales invoice, a purchase order, an item receipt, a credit note, or a credit memo, among different illustrative examples. Other types of transactions may also be represented, and are not limited to the particular illustrative examples listed here.

For example, an illustrative row 12 of editable fields is depicted as the top row among several analogous rows of editable fields, where row 12 includes editable field 11, configured to receive an input in the format of a date, editable field 13 is configured to receive a text format input indicated with the column label "Supplier", and editable field 14 is configured to receive an input indicated with the column heading "nominal accounts", in this illustrative embodiment. Sample inputs are depicted in these fields, although any or no inputs may be entered as appropriate. Editable field 15 is configured to receive a text input or a selection from among a collection of selectable options indicating a tax code. Editable field 15 is depicted to have received an input for the letter "S", which may indicate the selection of a code for a value-added tax (V.A.T.), in this illustrative embodiment. This may be one of several available pre-defined tax codes, which may be associated with a selectable tax jurisdiction, which is depicted as having been selected in editable field 16 for the United Kingdom as the applicable tax jurisdiction for the transaction represented in row 12.

Other jurisdictions may also be selected while the tax code or type of tax remains the same, and that type of tax as applicable in that jurisdiction may be applied. Different types of tax or tax codes may also be selected. For example, jurisdiction editable field or option selectable field 16 may be used to input or select other jurisdictions that also have a value-added tax, such as Germany, France, or Belgium. The automatic calculation system 10 may combine the inputs of the tax code for the V.A.T. as entered in editable field 15, the date of Jan. 1, 2007 entered in editable field 11, and the jurisdiction entered in editable field 16, and automatically apply the applicable V.A.T. for that jurisdiction at that date, i.e. 19%, 19.6%, or 21% for Germany, France, or Belgium respectively. The information on what taxes are applicable and what their rates are in each selectable jurisdiction during what dates may, for example, be stored in a database accessible to the automatic calculation system 10, either locally or remotely, and the database may be subject to regular, automated updates to reflect new information and new changes in applicable taxes, for example. A different tax code may also be entered or selected, indicating a different type of applicable tax, such as a sales tax, an excise tax, a tariff, a property tax, or a transfer tax, for example.

In another embodiment, a tax code for a combined set of taxes may be selected or defined, or additional columns may be used to indicate multiple different individual taxes applicable to the same transactions, for example. Additionally, the user may also have the option to manually enter an input defining a new mathematical relation defining a new tax and/or tax rate, and may use and/or store the new rate for use with different transactions selected by the user.

Automatic calculation system 10 may also automatically provide the possible applicable taxes in a jurisdiction once that jurisdiction has been selected, in an illustrative embodiment. For example, if a user selects the jurisdiction "Canada: Quebec", selectable tax codes may automatically be provided for the federal Goods and Services Tax (GST) and the provincial Quebec Sales Tax (QST). Selecting this jurisdiction may also be used to reconfigure the editable fields to add additional columns, for a tax code and a tax for both the GST and the QST, as well as an intermediate gross amount for the net amount plus GST, and a cumulative gross amount for the intermediate gross amount plus QST, as an illustrative example. In this case, a numeric value may be entered in any of three editable fields, for net amount, intermediate gross amount, or cumulative gross amount, and output values may be automatically calculated and displayed for both of the other two values based on whichever one of the three values is entered, i.e. whichever one of the editable fields the numeric input is received in. In other jurisdictions, multiple sales taxes may be treated and calculated as a harmonized sales tax, with components that are each calculated on the basis of the net amount, rather than being calculated cumulatively.

FIG. 1 further depicts editable field 17, indicated in the column header to be associated with a net amount, or net monetary value. Field 19 is indicated to be associated with a tax, and editable field 21 is indicated to be associated with a gross amount, or gross monetary value. The net amount editable field 17, gross amount editable field 21, and other elements of row 12 may be associated with a record of an individual commercial or financial transaction of the type indicated for the sheet or file within which it is included. In other embodiments, the elements of a row may also include information from several transactions, or a segment of information related to transactions described in other arrays or rows, for example. The different stored tax codes or manually entered tax rates therefore provide a variety of different mathematical relations that may be selected from, and used together with a numeric input entered into the net amount editable field 17 or the gross amount editable field 21 to calculate an output for whichever of the net amount or gross amount was not provided by the numeric input.

The automatic calculation system 10 enables an input value to be received, via a user input, for example, in either the net amount editable field 17 or the gross amount editable field 21. The input value may be received from a manual user input, or automatically provided from a point-of-sale (P.O.S.) device, another application hosted on the same computing system, or from a network-accessible or otherwise separate computing resource, for example. After an input is received in either net amount editable field 17 or gross amount editable field 21, automatic calculation system 10 may automatically calculate an output value based on the input, and display the output value in whichever one of the net amount editable field 17 or gross amount editable field 21 that does not receive the input value.

The editable field from among these options that does not receive the input therefore becomes an output field. The output value that is calculated is based on the input value in that it is related by a mathematical relation between two variables, which correspond to net amount editable field 17 and gross amount editable field 21 in this illustrative embodiment. Specifically, in this illustrative embodiment, the mathematical relation used to generate the automatically calculated output, represents the addition of the appropriate tax to the net monetary value of the net amount editable field 17, to determine the gross monetary value of the gross amount editable field 21.

As a particular example, in the illustrative context depicted in FIG. 1, a numeric input of 100 is entered by a user in net amount editable field 17. This is represented as "£100.00", depicting the numeric input in terms of 100 pounds in the currency of the selected jurisdiction, the U.K. The selected tax of the value-added tax (V.A.T.) in the selected jurisdiction of the U.K., as of the selected date of Jan. 1, 2007, as shown in the date editable field 11, is provided as 17.5%. The mathematical relation used for the automatic calculation in the row 12, in response to a numeric value being entered in net amount editable field 17, therefore includes applying the selected tax to the net amount in net amount editable field 17 to determine the gross amount in gross amount editable field 21.

The net amount and gross amount constitute two variables related by a mathematical relation in which the gross amount is determined as the net amount plus the selected tax, or $G=N*(1+T)$, where G represents the gross amount, N represents the net amount, and T represents the selected tax rate, in this illustrative embodiment. The added tax by itself, equal to the net amount times the tax rate or $X=N*T$, where X is the added tax, may also be displayed as a separate output in tax output field 19. The output value for the gross amount based on the numeric input received as the net amount is calculated as $£100.00*(1+0.175)=£117.50$, in this simple example. This output value of £117.50 is then displayed in editable field 21, thereby indicated to represent the gross monetary value resulting from the received net value plus the tax applicable to that net value.

The added tax by itself of £17.50, determined by the mathematical relationship of $X=N*T$, where X is the added tax, is also displayed in editable field 19, in this illustrative embodiment. This is one example of an additional output value, besides the output value for the gross amount in editable field 21, that may also be calculated based on the input value entered for the net amount editable field 17 and a mathematical relation and displayed in its own field.

Analogous collections of information, including net amounts or gross amounts, may further be entered in editable fields in any of the additional rows in addition to illustratively depicted row 12. The summed total of the values in the editable fields under the "net amount" column 18 may be displayed in the "total net" field 23; the summed total of the values in the editable fields under the "tax" column 20 may be displayed in the "total tax" field 25; and the summed total of the values in the editable fields under the "gross amount" column 22 may be displayed in the "total gross" field 27. These are further illustrative examples of output values that may be determined based on input values, including net amount and/or gross amount input values in different rows or transactions, and mathematical relations including the calculation of gross amount and/or net amount output values and the summation of net amount, tax, and gross amount values from multiple transactions.

The net amount field 17 is not the only option for entering an amount for the transaction associated with row 12. Instead of, or subsequently to, entering a value in net amount editable field 17, a user may enter a numeric value in gross amount editable field 21. Whereas gross amount editable field 21 is used in the example described above and depicted in FIG. 1 to display the output value generated by an automatic calculation based on the input received in net amount editable field 17, a similar but reverse calculation may also be performed using a numeric value entered in gross amount editable field 21 as the input, and displaying a corresponding output value in net amount editable field 17.

Users may have either a net amount or a gross amount that they want to enter for any particular transaction, or corresponding row, and may want to enter net amounts in some rows and gross amounts in other rows. Users may also initially enter an estimate in one field, and later enter an exact amount in the other field as it later becomes known to them. Users may have any number of reasons for entering either a net amount or a gross amount as their input, and/or entering one of the values first but later overwriting the generated output for either the other value or the same value with a new input. Automatic calculation system 10 allows either the net amount or the gross amount to be entered as an input for each row, any number of times, and each time the other editable field may become the output field, and replace the other value with an automatically calculated output value that corresponds to and is calculated based on the input value.

FIG. 2 depicts automatic calculation system 10 in another aspect 10B, in which a new input value has been entered in gross amount editable field 31. This may be for a new entry, or it may include overwriting the generated output value displayed in gross amount editable field 21 of FIG. 1. The same tax code remains selected in tax code editable field 15, in this example. The same mathematical relation may be used as in the example described above and depicted in FIG. 1, i.e. $G=N*(1+T)$, only using a different input value and used to calculate a different output value. Namely, the same mathematical relation may be rewritten as the equivalent expression $N=G/(1+T)$, where the net amount N is determined as a function of the received gross amount G divided by 1 plus the tax rate T.

In the illustrative example depicted in FIG. 2, the new numeric value 100 has been entered in gross amount editable field 31, where it is represented in terms of British currency as "£100.00". A separate value for the added tax itself is automatically calculated and represented in tax editable field 35 as £14.89. This may be calculated as $X=G*T/(1+T)$, using the received input 100 as G and the tax rate of 17.5% corresponding to the selected tax of the U.K. V.A.T. for the tax rate T, rendering a value of 14.89 (rounded to the nearest hundredth) for the applicable tax. The net amount itself may also be calculated as $N=G-X$, using the received input 100 as G and the tax value X of 14.89, rendering an output value of 85.11 for the net amount N. This is displayed in net amount editable field 35, represented in U.K. currency as £85.11. The calculations of the tax in editable field 33 and the net amount in editable field 35 may be part of the same process, as routine optimization is likely to favor the results of overlapping segments of calculation being derived from a single instance of the calculation. Additional fields may also be automatically re-calculated based on the new input, such as total net field 23B, total tax field 25B, and total gross field 27B, for example.

A user is therefore enabled to enter a value for either the net amount or the gross amount, and have the other value automatically calculated. The other value may be automatically calculated in that, as soon as the user indicates that she is finished entering the one entered value, such as by pressing a "tab" or "enter" button after entering a numeric value in one of the editable fields, the value for the other editable field or fields that are associated by a mathematical relation with the field receiving the input are then automatically calculated and displayed.

Fields 11, 13, 17, 15, 19, and 21 of FIG. 1 all lie within a single row 12, and each lie within a column that intersects many additional rows. Each row is configured to correspond to one array of related information, such as may be associated with one transaction, that is associated with a mathematical relationship defined between two or more variables corresponding to two or more numeric values within that array of related information. Different configurations of the automatic calculation system 10 may include any number of rows of editable fields in a single sheet, from only one or two to a very large number, so that only a fraction of the available rows in the sheet are visible on screen at one time and that must be scrolled through or otherwise manipulated to view additional rows. Additional rows or other arrays may also be used, in any number of additional sheets in the same file or any number of additional files.

Any number and variety of different editable fields may also be used within a row. The examples shown in FIGS. 1 and 2, of editable fields labeled for values such as "date", "supplier", "net amount", "tax code", "tax", and "total", are representative examples only, and any variety of other labels or types of values may be used for editable fields in other configurations within the depicted embodiment or in other embodiments.

Different relations may also be associated between the different rows or other forms in which arrays of related information are represented. The addition of values from multiple rows within certain columns, such as the addition of the values in the columns labeled "net amount", "tax", and "total" in FIGS. 1 and 2 to derive the values for the "total net" field 23, the "total tax" field 25, and the "total gross" field 27, are also illustrative only; any other type of relation may also be defined between different rows or arrays for other configurations or embodiments.

FIG. 3 depicts in flowchart form an illustrative method for automatic calculation system 300, analogous to those described with reference to FIGS. 1 and 2. Automatic calculation system 300 includes step 301, of enabling an input value to be received in either one of a first editable field or a second editable field in an application graphical interface, wherein the other one of the first editable field or the second editable field that does not receive the input value becomes an output field. Automatic calculation system 300 further includes step 303, of calculating an output value for the output field based on the input value and a pre-defined mathematical relation between a first variable and a second variable. Step 303 includes a decision node 305, of evaluating if the input value is received in the first editable field or the second editable field. If the input value is received in the first editable field, the input value is used as the first variable and the output value is calculated for the second variable based on the relation and the first variable, as in step 306. If the input value is received in the second editable field, the input value is used as the second variable and the output value is calculated for the first variable based on the relation and the second variable, as in step 307. Automatic calculation system 300 proceeds further with step 309, of displaying the output value in the output field. As with other examples described above, this particular embodiment is illustrative only, and other embodiments may also include three or more fields that are all related by mathematical relations, where some or any of the fields may receive a new input, and the output values for the other fields may be re-calculated based on the new input received in one of the fields.

FIG. 4 illustrates an example of a suitable computing system environment 100 on which various embodiments may be implemented. For example, various embodiments may be implemented as software applications, modules, or other forms of instructions that are executable by computing system environment 100 and that configure computing system environment 100 to perform various tasks or methods involved in different embodiments. A software application or module embodying an embodiment of a system for automatic calculation with multiple editable fields may be developed in any of a variety of programming or scripting languages or environments. For example, it may be written using X++, SQL, TSQL, C#, F#, C++, C, Pascal, Visual Basic, Java, JavaScript, Delphi, Eiffel, Nemerle, Perl, PHP, Python, Ruby, Visual FoxPro, Lua, variations thereof, or any other programming language or combination of languages. It is also envisioned that new programming languages and other forms of creating executable instructions will continue to be developed, in which further embodiments may readily be developed.

According to one illustrative embodiment, computing system environment 100 may be configured, such as by executable instructions stored in system memory 130, to perform automatic calculations in response to receiving an input in any of multiple editable fields. Computing system environment 100 may be configured to define a mathematical relation between a first variable and a second variable; to display various editable fields, that correspond to the first and second variable, in a graphical user interface on monitor 191; and to receive a numeric input in one of the editable fields, such as by one of the editable fields being selected with a pointing device 161 and a numeric value entered via keyboard 162. Computing system 100 may be configured to respond to receiving the numeric input in one of the editable fields that corresponds to the first variable, by calculating a solution for a second variable of the mathematical relation using the numeric input as the first variable, and displaying the solution in the second editable field. Or, if the numeric input is received in one of the editable fields corresponding to the second variable, the computing system 100 may be configured to respond by calculating a solution for the first variable of the mathematical relation using the numeric input as the second variable, and displaying the solution in the first editable field, in an illustrative embodiment.

While the solutions are displayed in editable fields other than the one in which the numeric input was entered, the editable fields in which the solutions are displayed may also be subsequently edited. In this case, the process may be repeated but based on the new input, and other variables with mathematical relations to the variable corresponding to the editable field in which the new numeric input is received may be re-calculated, including the value for the editable field in which prior inputs were received, in an illustrative embodiment.

Computing system environment 100 as depicted in FIG. 4 is only one example of a suitable computing environment for executing and providing output from various embodiments, and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments may be operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, conduit devices that rely on remote server farms or other computing resources for processing, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 4, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable volatile/nonvolatile computer storage media. By way of example and not limitation, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may be operated in a networked environment using logical connections to one or more remote computers, such as a remote computer 180. The remote computer 180 may be a personal computer, a hand-held device, a server, a server farm, a router, a network PC, a peer device or other common network node, and typically includes many or all of the elements described above relative to the computer 110. The logical connections depicted in FIG. 4 include a local area network (LAN) 171 and a wide area network (WAN) 173, and may also include other networks. Such networking environments may include examples that are commonplace in offices, enterprise-wide computer networks, intranets and the Internet.

When used in a LAN networking environment, the computer 110 may be connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on remote computer 180. It will be appreciated that the network connections shown are exemplary and other means of establishing a communications link between the computers may be used.

The logical connections used by remote computer 180 also include a wireless network 198, which connect it to a mobile device 199, which may therefore also be in connection with computer 110 or other computers communicatively connected to the above logical connections. Mobile device 199 may constitute a mobile computing device that may also include a medium, readable by the mobile computing device, comprising executable instructions that are executable by the mobile computing device, according to another illustrative embodiment. Mobile device 199 may illustratively include a microprocessor, memory, input/output (I/O) components, and a communication interface for communicating with remote computers or other mobile devices. Mobile device 199 may also include any or all of the components depicted and described as comprised in computer 110, or analogous components directed more particularly to a mobile computing environment. Mobile device 199 may be enabled to make use of executable instructions stored on the media of its memory component, such as executable instructions that enable computing device 199 to perform tasks such as automatically to generate metamodel-based reports and related tasks, in a variety of illustrative embodiments. Mobile device 199 may alternately serve as a "dummy" device or proxy device, with its own network interface, buffer memory, and input/output mechanisms, while relying on frequent communication with remote computing resources that run executable instructions for processing an application and deliver outputs from the application to the proxy device, in another illustrative embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, while the terms "computer", "computing device", or "computing system" may herein sometimes be used alone for convenience, it is well understood that each of these could refer to any computing device, computing system, computing environment, mobile device, or other information processing component or context, and is not limited to any individual interpretation. As another illustrative example, some illustrative embodiments are depicted and described in terms of a graphical user interface, while it is well understood that comparable embodiments may also be implemented with a command line interface, a tactile user interface, a voice user interface, or any other type of user interface, and that the graphical user interface described and depicted is only one illustrative example of compatible interfaces. As yet another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances while still remaining consistent with and encompassed by the elements defined by the claims herein.

What is claimed is:

1. A method, implemented at least in part by a computing system having a computer processor, the method comprising:
   displaying simultaneously on a user interface a plurality of transaction records pertaining to a plurality of sales transactions, each of the transaction records having a plurality of user-editable fields including:
      a date field,
      a supplier field,
      an editable net sales amount field,
      an editable gross sales amount field, and
      an editable sales tax code field;
   displaying a jurisdiction field;
   receiving a user input in the jurisdiction field selecting a particular jurisdiction and providing one or more applicable tax codes for the selected jurisdiction as selectable options in the sales tax code field of a first transaction record;
   receiving an input value in one of the net sales amount field or the gross sales amount field of the first transaction record, the input value being received as either a net sales amount or a gross sales amount;
   receiving a user input in the sales tax code field of the first transaction record selecting at least one of the one or more applicable tax codes for the selected jurisdiction;
   calculating, with the computer processor, an output value based on the input value and a pre-defined mathematical sales tax relation, identified based on the at least one applicable tax code selected in the sales tax code field of the first transaction record, between a net sales amount and a gross sales amount; and
   displaying the output value in an output field along with a tax amount calculated using the sales tax relation, the output field comprising one of the gross sales amount field and the net sales amount field of the first transaction record that did not receive the input value.

2. The method of claim 1, wherein the net sales amount field of each record is associated with a net monetary value, the gross sales amount field of each record is associated with a gross monetary value, and the sales tax code field is associated with a tax relation value that defines an addition of a tax applicable to the net monetary value to determine the gross monetary value.

3. The method of claim 2, wherein the input value is derived from either a net amount or a gross amount associated with at least one transaction type selected from among: a purchase invoice, a cash receipt, a cash payment, a price quote, a sales order, a sales invoice, a purchase order, an item receipt, a credit note, or a credit memo.

4. The method of claim 1, further comprising:
   determining one or more additional fields to add to the user interface based on one or more user inputs, and displaying the one or more additional fields.

5. The method of claim 1, the method comprising:
   receiving a first input value in the net sales amount field of the first transaction record as a net sales amount;
   calculating the output value as a gross sales amount based on the first input value and displaying the output value in the gross sales amount field of the first transaction record;
   receiving a second input value as a gross sales amount received in the gross sales amount field of a second transaction record;
   calculating a second output value as a net sales amount based on the second input value; and
   displaying the second output value in the net sales amount field of the second record.

6. The method of claim 1, further comprising receiving a jurisdiction selection to identify a selected jurisdiction from a plurality of possible jurisdictions and automatically using an applicable tax relation, from among a plurality of stored mathematical tax relations, for the selected jurisdiction as the mathematical tax relation.

7. The method of claim 1, further comprising receiving one or more automated updates of the stored mathematical tax relations, and incorporating the automated update in calculating the output value.

8. A computer storage medium comprising instructions executable by a computing system, wherein the instructions configure the computing system to:
   simultaneously display, in an application user interface on a display device, a plurality of transaction records, each record of the plurality of records pertaining to a sales transaction and having at least three user-editable fields including a user-editable gross sales amount field for the sales transaction, a user-editable tax field for the sales transaction, and a user-editable net sales amount field for the sales transaction;
   receive user input for each record of the plurality of records, such that each record receives at least:
      a user-input tax indicator, in the user-editable tax field of the record, indicative of a pre-defined mathematical tax relation, and
      a user-input value as either:
         a net sales amount received in the net sales amount field of the record, or
         a gross sales amount received in the gross sales amount field of the record,
      wherein at least one of the plurality of records receives a net sales amount in the net sales amount field of the record and at least one of the plurality of records receives a gross sales amount in the gross sales amount field of the record, and at least one of the plurality of records receives a tax indicator that is different than another one of the plurality of records;

for each of the at least one record that received a net sales amount in the net sales amount field:
calculate a gross sales amount for the gross sales amount field of the record based on the net sales amount and the selected mathematical tax relation for the record; and for each of the at least one record that received a gross sales amount in the gross sales amount field:
calculate a net sales amount for the net sales amount field of the record based on the gross sales amount and the selected mathematical tax relation for the record.

9. The computer storage medium of claim 8, wherein the selected mathematical tax relation defines an addition of a tax applicable to the net sales amount to determine the gross sales amount.

10. The computer storage medium of claim 9, wherein the input value is derived from a gross amount associated with at least one transaction type selected from among: a purchase invoice, a cash receipt, a cash payment, a price quote, a sales order, a sales invoice, a purchase order, an item receipt, a credit note, or a credit memo.

11. The computer storage medium of claim 8, wherein the instructions configure the computing system to: calculate and display one or more additional output values for one or more additional fields based on the input value and one or more additional mathematical relations.

12. The computer storage medium of claim 8, wherein the instructions configure the computing system to receive user input defining a new mathematical relation, and calculate the output value based on the new mathematical relation.

13. The computer storage medium of claim 8, wherein the mathematical tax relation is selectable from among a sales tax, a value-added tax, an excise tax, a tariff, a property tax, or a transfer tax.

14. The computer storage medium of claim 8, further comprising
receiving a user input selecting a particular jurisdiction; and
providing applicable tax codes for the selected jurisdiction as selectable options for the mathematical tax relation.

15. A computing system comprising:
a processor;
an input mechanism, communicatively connected to the processor;
a monitor, communicatively connected to the processor; and
a computer storage medium, communicatively connected to the processor and readable by the processor, wherein the computer storage medium comprises executable instructions, which, when executed by the processor, configure the computing system to:

receive a first user input in a displayed jurisdiction field selecting at least one jurisdiction;
receive a second user input in a displayed tax code field, that is separate from the jurisdiction field, identifying a tax code;
determining a mathematical tax relation between a gross sales variable and a net sales variable based on the first user input and the second user input;
simultaneously display a first editable field and a second editable field in a user interface on the monitor;
receive a numeric input in either the first editable field or the second editable field;
respond to receiving the numeric input in the first editable field by breaking the numeric input into a net sales amount and a tax amount by calculating a solution for the net sales variable of the mathematical tax relation using the numeric input as the gross sales variable and displaying the solution in the second editable field, along with the tax amount; and
respond to receiving the numeric input in the second editable field by calculating a solution for the gross sales variable of the mathematical tax relation using the numeric input as the net sales variable and displaying the solution in the first editable field along with a tax amount calculated on the net sales variable.

16. The computing system of claim 15, wherein the mathematical tax relation is selected from among a sales tax, a value-added tax, an excise tax, a tariff, a property tax, or a transfer tax.

17. The computing system of claim 15, wherein the computing system is configured to provide applicable tax codes for the selected jurisdiction as selectable options for the mathematical tax relation in the displayed tax code field.

18. The computing system of claim 15, wherein the net sales variable is associated with a net monetary value, the gross sales variable is associated with a gross monetary value, and the mathematical tax relation defines an addition of a tax applicable to the net monetary value to determine the gross monetary value.

19. The computing system of claim 18, wherein the numeric input is derived from either a net amount or a gross amount associated with at least one transaction type selected from among: a purchase invoice, a cash receipt, a cash payment, a price quote, a sales order, a sales invoice, a purchase order, an item receipt, a credit note, or a credit memo.

20. The method of claim 1, comprising:
identifying the mathematical sales tax relation based on the selected jurisdiction, the selected applicable tax code, and a date entered into the date field.

* * * * *